(12) United States Patent
Buttner

(10) Patent No.: US 8,998,184 B2
(45) Date of Patent: Apr. 7, 2015

(54) VENTILATED AIR BELLOWS FOR A PNEUMATIC SPRING, PNEUMATIC SPRING CONTAINING A VENTILATED AIR BELLOWS, AND PNEUMATIC SPRING SYSTEM CONTAINING VENTILATED AIR BELLOWS

(75) Inventor: Josef Buttner, Waldaschaff (DE)

(73) Assignee: SAF-Holland GmbH, Bessenbach (DE)

( * ) Notice: Subject to any disclaimer, the term of this patent is extended or adjusted under 35 U.S.C. 154(b) by 127 days.

(21) Appl. No.: 13/696,926

(22) PCT Filed: May 6, 2011

(86) PCT No.: PCT/EP2011/057317
§ 371 (c)(1),
(2), (4) Date: Nov. 8, 2012

(87) PCT Pub. No.: WO2011/141378
PCT Pub. Date: Nov. 17, 2011

(65) Prior Publication Data
US 2013/0056917 A1 Mar. 7, 2013

(30) Foreign Application Priority Data
May 10, 2010 (DE) .......................... 10 2010 028 810

(51) Int. Cl.
*F16F 9/05* (2006.01)
*F16F 9/43* (2006.01)

(52) U.S. Cl.
CPC .. *F16F 9/052* (2013.01); *F16F 9/43* (2013.01)

(58) Field of Classification Search
CPC ......... F16F 9/04; F16F 9/0472; F16F 9/0481; F16F 9/05; F16F 9/068; F16F 9/34; F16F 9/3415; F16F 9/348; F16F 9/516
USPC ............................. 267/64.23, 64.27, 122, 123
See application file for complete search history.

(56) References Cited

U.S. PATENT DOCUMENTS

| 2,537,637 | A | * | 1/1951 | Candlin, Jr. et al. ........ | 267/64.23 |
| 2,694,569 | A | * | 11/1954 | Gouirand ................... | 267/64.27 |
| 2,713,498 | A | * | 7/1955 | Brown .......................... | 280/683 |
| 2,842,359 | A | * | 7/1958 | Auer ........................... | 267/64.23 |
| 2,916,298 | A | * | 12/1959 | McMullin .................. | 267/64.24 |

(Continued)

FOREIGN PATENT DOCUMENTS

| CN | 2113642 | 8/1992 |
| CN | 101074712 | 11/2007 |

(Continued)

OTHER PUBLICATIONS

European International Search Report.

*Primary Examiner* — Thomas J Williams
(74) *Attorney, Agent, or Firm* — Price Heneveld LLP

(57) ABSTRACT

The invention relates to an air bellows for a pneumatic spring, in particular of a commercial vehicle, the air bellows including an axle-side region and a body-side region, wherein the axle-side region is arranged on a plunger and movable by a compression or extension movement between a first, compressed position and a second, extended position, and further including an interior space adapted to be filled with compressed air via a compressed air opening that is connectable to a compressed air line. The air bellows further comprises a valve connected to the atmosphere for ventilating the interior space, wherein by applying compressed air present in the interior space to the valve the valve is moved to a closed position.

17 Claims, 6 Drawing Sheets

(56) References Cited

U.S. PATENT DOCUMENTS

| | | | |
|---|---|---|---|
| 3,876,193 A * | 4/1975 | Clary | 267/64.16 |
| 4,569,803 A * | 2/1986 | Takakura et al. | 267/123 |
| 4,762,308 A * | 8/1988 | Geno | 267/64.27 |
| 5,029,824 A * | 7/1991 | LaBeau et al. | 267/140.13 |
| 6,422,543 B1 | 7/2002 | Fejerdy | |
| 8,540,222 B2 * | 9/2013 | Westnedge et al. | 267/64.27 |
| 8,568,130 B2 * | 10/2013 | Ouviev | 137/849 |
| 8,844,912 B2 * | 9/2014 | Naber | 267/64.27 |
| 2010/0001444 A1 | 1/2010 | Weber | |
| 2011/0115140 A1 * | 5/2011 | Moulik et al. | 267/64.23 |

FOREIGN PATENT DOCUMENTS

| | | |
|---|---|---|
| DE | 4401770 | 8/1995 |
| DE | 19505026 | 8/1996 |
| DE | 19733281 | 2/1999 |
| DE | 19855229 | 8/1999 |
| DE | 20115998 | 1/2002 |
| DE | 69817218 | 7/2004 |
| EP | 0446709 | 9/1991 |
| JP | 59050241 A * | 3/1984 |
| JP | 11078877 | 3/1999 |

* cited by examiner

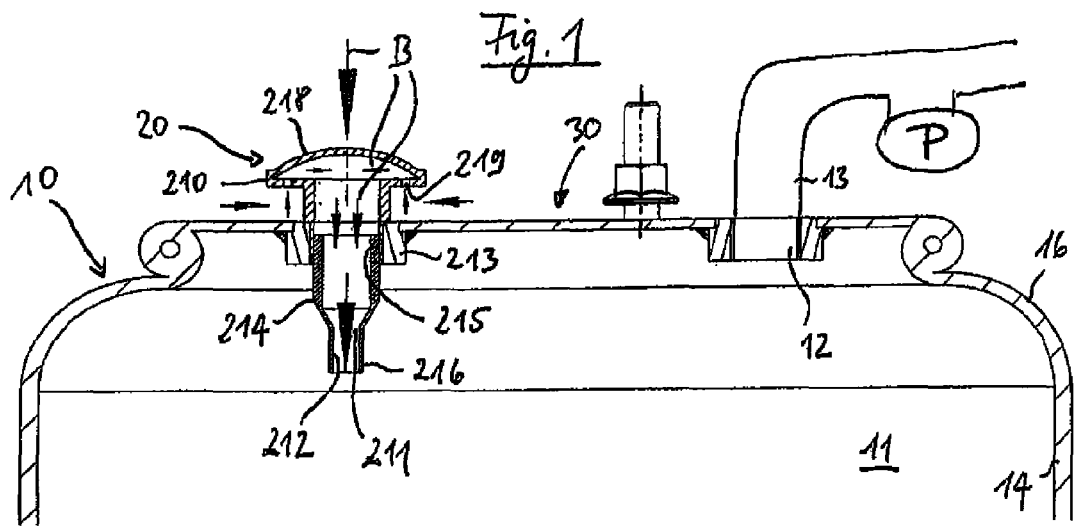
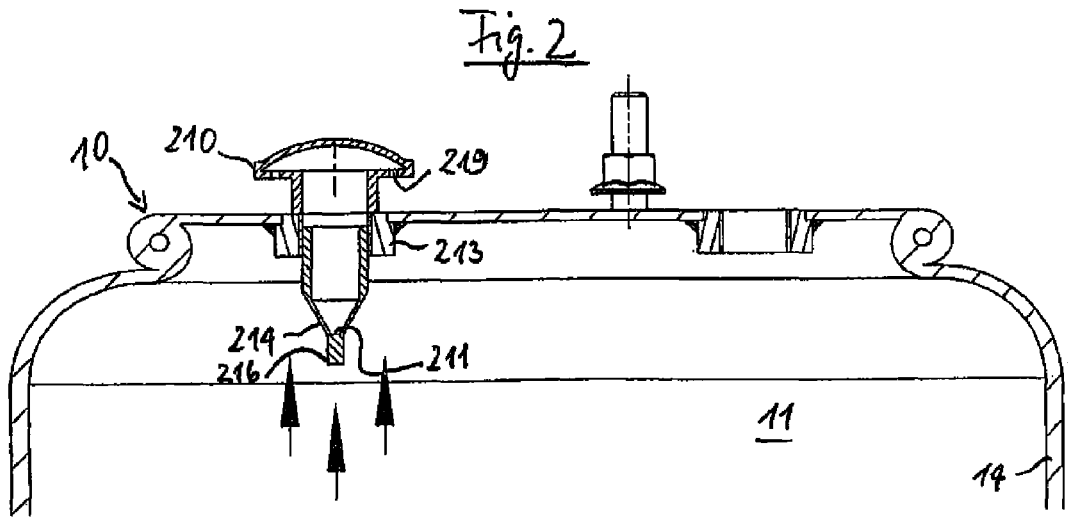

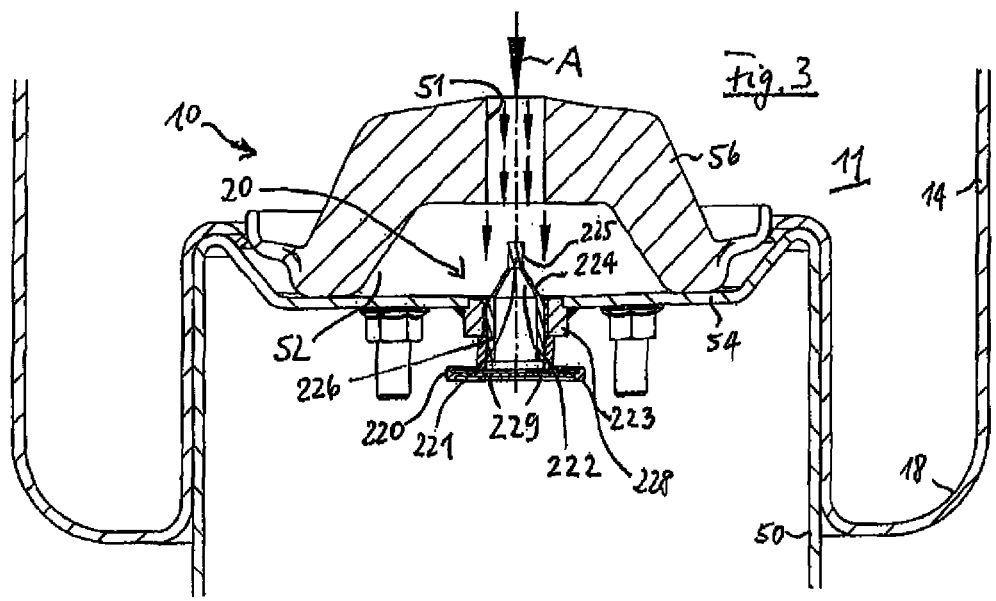
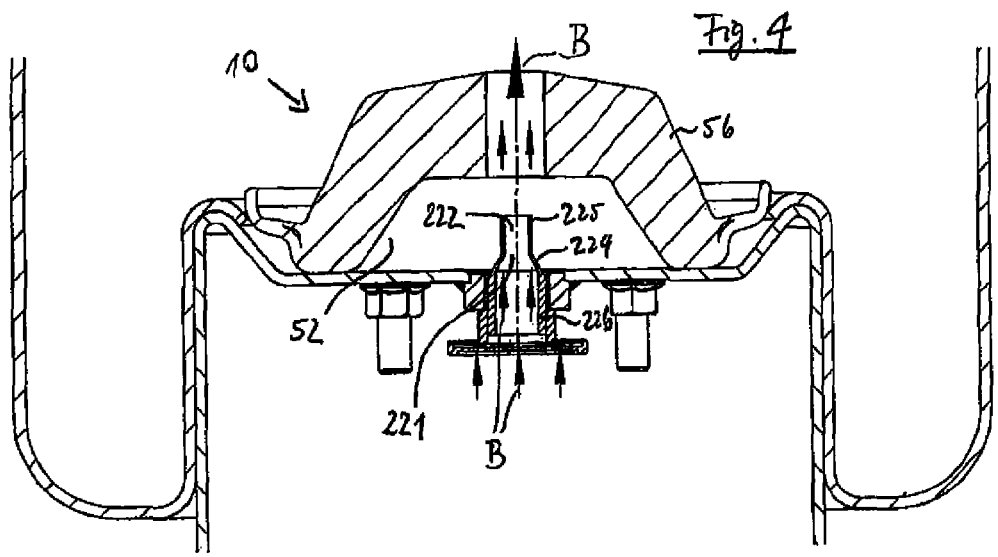

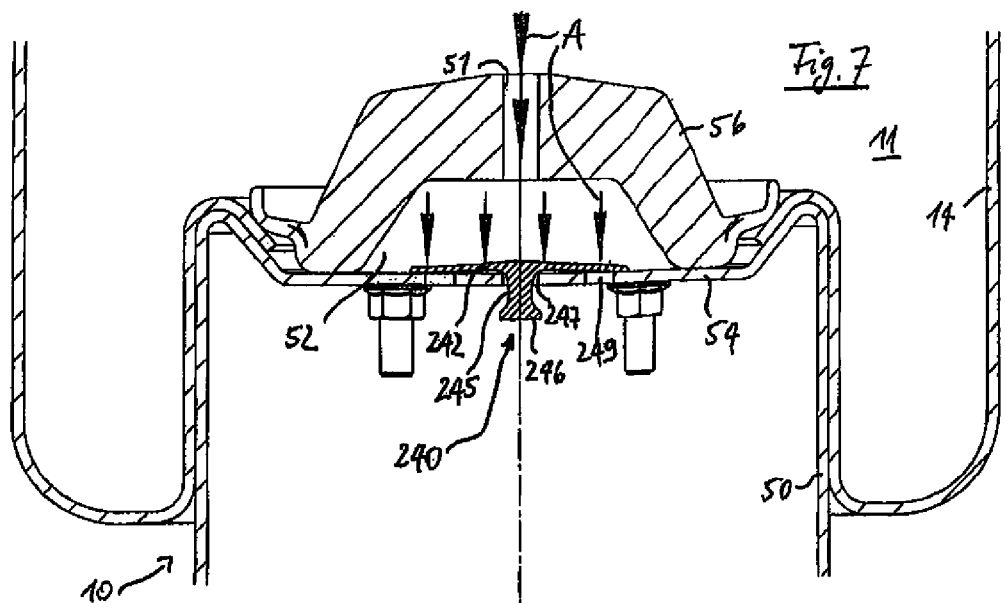
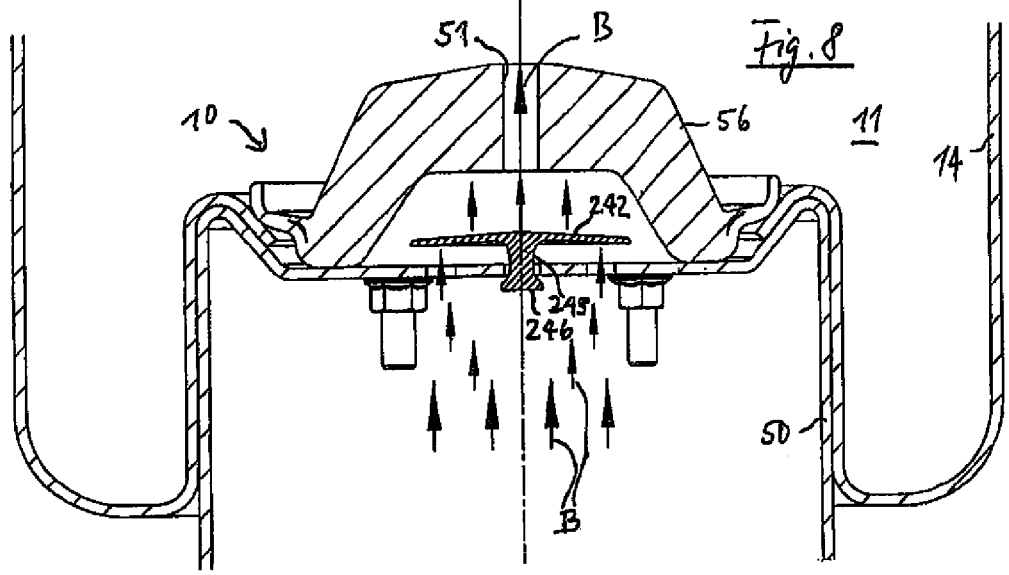

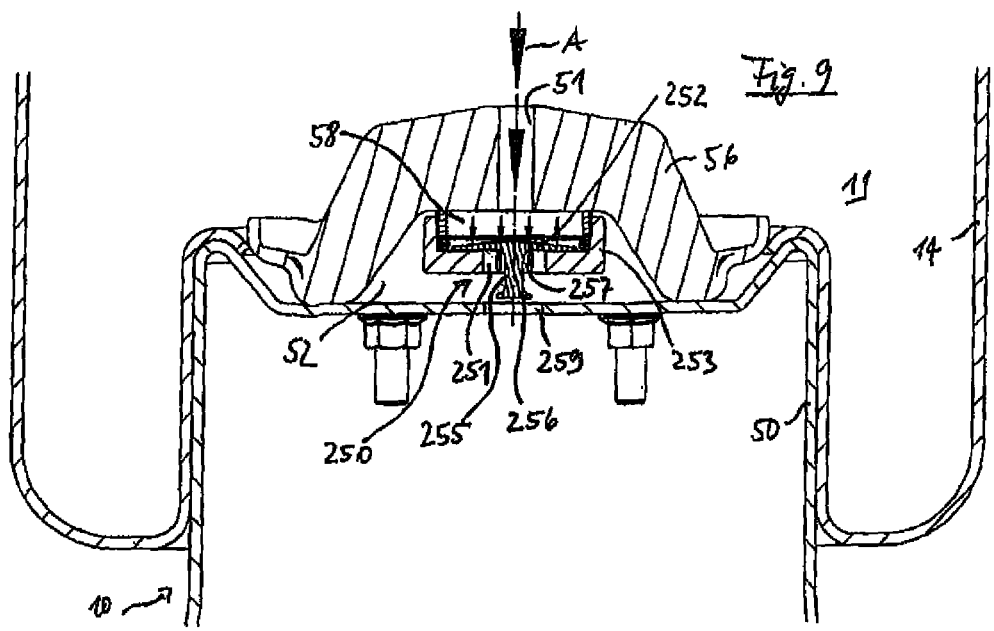
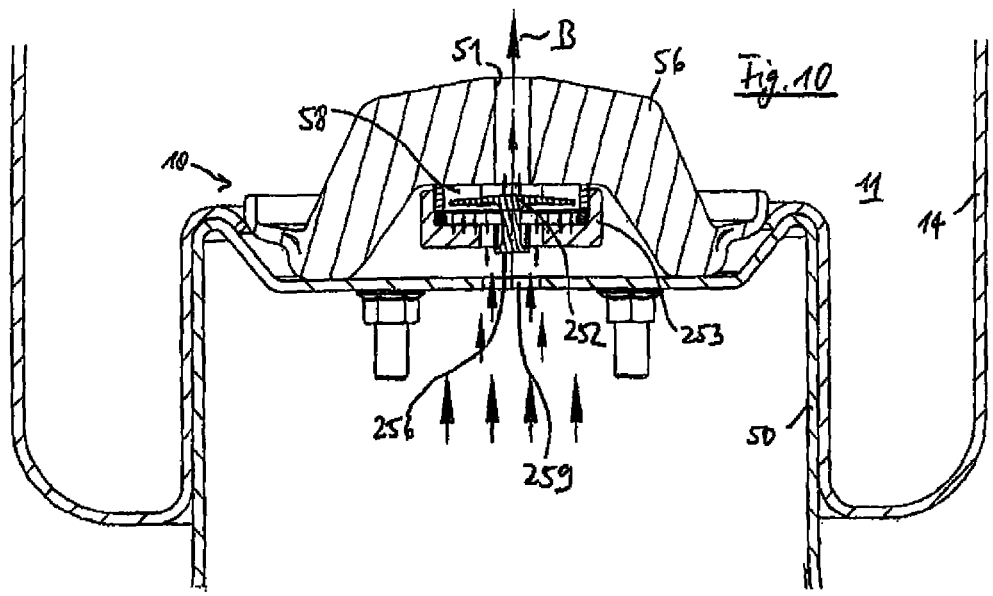

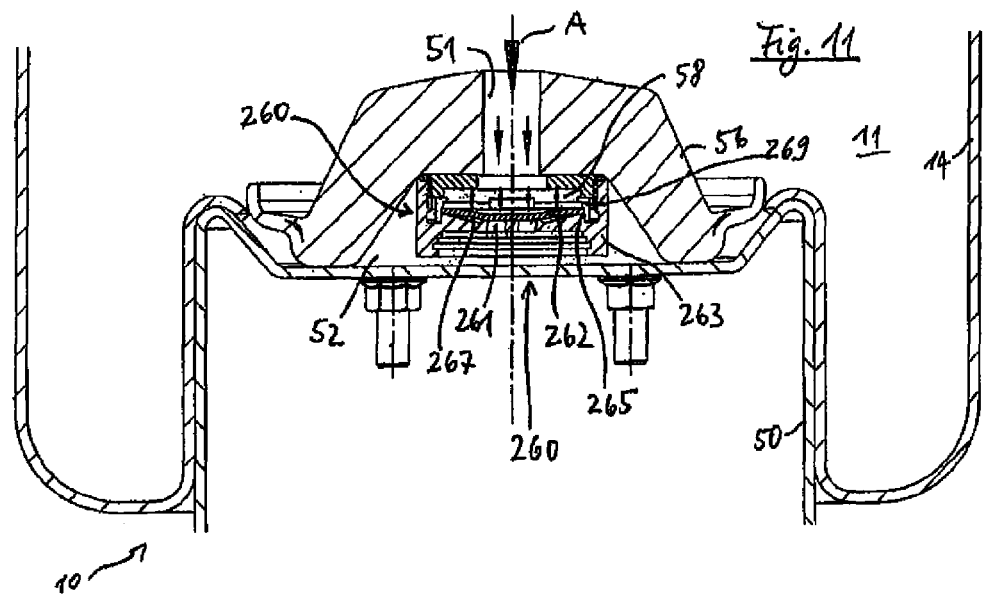
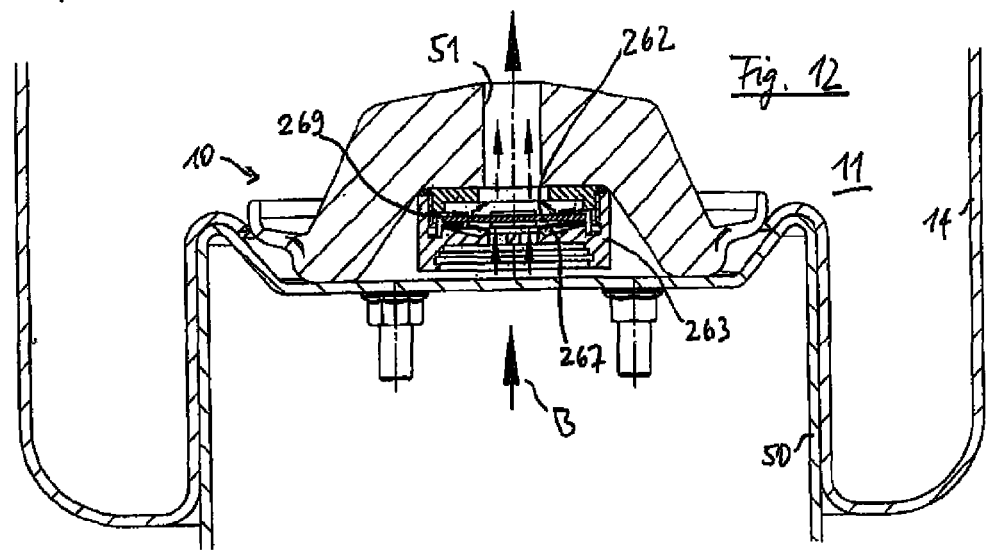

US 8,998,184 B2

VENTILATED AIR BELLOWS FOR A PNEUMATIC SPRING, PNEUMATIC SPRING CONTAINING A VENTILATED AIR BELLOWS, AND PNEUMATIC SPRING SYSTEM CONTAINING VENTILATED AIR BELLOWS

BACKGROUND OF THE INVENTION

The present invention relates to a ventilated air bellows for a pneumatic spring, a pneumatic spring containing a ventilated air bellows as well as a pneumatic spring system containing ventilated air bellows.

Conventionally, a vehicle axle of a commercial vehicle comprises an axle body which by means of at least one trailing arm forms an axle assembly and therefore is movably hinged on the vehicle frame and supported relative to the vehicle frame by means of a pneumatic spring arranged above or behind the crossing area of the axle body and the trailing arm. The pneumatic spring in turn comprises an air bellows arranged between a top and a base plate, wherein for a mechanical coupling between the air bellows on the one hand and the axle assembly on the other hand there is provided a plunger which is arranged on the air bellows. At its axle-side portion the air bellows is connected to the plunger, wherein an outer surface of the plunger serves as a rolling or unfolding surface for the air bellows so that a guided movement of the air bellows is ensured during operation when the plunger moves up and down.

However, such pneumatic springs are to a limited extent only suitable for crane and train loading since due to the weight of the axle, which will then hang below the vehicle, the air bellows is completely extended or unfolded without further support devices so that a negative pressure is generated in the air bellows relative to its surroundings. When the vehicle is set down, there is the danger that the air bellows folds towards the inside or tilts relative to the plunger or folds in and, hence, does not unroll or unfold along the plunger, as would be normal operation, which might lead to damage.

In order to avoid this problem, conventionally in crane and train loading the range of spring of the pneumatic spring is limited by means of mechanical locking with the help of a tensioning or gripping device attached to the vehicle frame, or a divided plunger is used. Alternatively, the pneumatic spring may also be designed such that the pneumatic spring is releasably connected to the body and, in the case of crane loading of the trailer, is separated from the body by means of a returning device, and by means of the returning device the top, and thus the bellows as well, is held in a defined position relative to the plunger so that the air bellows unrolls or unfolds along the plunger or is held in an unrolled or unfolded state. In addition, also the use of so-called "splitters" is possible, wherein the upper bellows attachment is attached not to the vehicle frame but to a pivoting arm.

The object underlying the invention is to provide an air bellows for a pneumatic spring, a pneumatic spring containing an air bellows as well as a pneumatic spring system containing air bellows, which are in a simple manner suitable for the crane loading of vehicles.

SUMMARY OF THE INVENTION

According to the invention there is provided a ventilated air bellows for a pneumatic spring, in particular of a commercial vehicle. The air bellows comprises an axle-side region and a body-side region, wherein the axle-side region can be arranged on a plunger and moved by means of a compression or extension movement between a first, compressed position and a second, extended position. The air bellows encloses an interior space, which can be filled with compressed air via a compressed air opening that is connected to a compressed air line. According to the invention the air bellows comprises a valve for ventilating the interior space, which valve is in communication with the atmosphere and which by applying the pressure present in the interior space can be moved into its closed position. To put it differently, the valve, at its outside, discharges into the atmosphere which is under atmospheric pressure, and the inside of the valve discharges into the interior space of the air bellows. The term "commercial vehicle" in the sense of the present invention does not only mean drawing vehicles such as trucks or tractor-trailers but also trailers or semi-trailers thereof. The axle-side support of the pneumatic spring may be positioned differently. The axle-side support may be a plunger attachment or a pneumatic spring support. The pneumatic spring support may be arranged on a rod or suspension arm of the axle assembly, for example. The axle-side region of the air bellows in the sense of the present invention is the end portion of the air bellows which, by means of the plunger and possibly further arranging means, is connected to the axle-side support of the pneumatic spring, i.e. the portion of the air bellows which is arranged on the plunger. The body-side region of the air bellows is the portion of the air bellows which is connected to the body by means of a top and possibly further arranging means. An air bellows according to the invention may have different states. In a basic state of the air bellows there are no external forces such as pulling, pushing and/or shearing forces acting on the air bellows. In particular, the basic state of the air bellows is that state in which the air bellows is when the air bellows installed in a pneumatic spring is inflated, for example, by means of compressed air and the compressed air is then again discharged from the air bellows, i.e. in the interior of the pneumatic spring there is yet again atmospheric pressure. In the basic state no additional force is applied to the pneumatic spring after inflation, apart from its own weight force. The air bellows may also have several operational states. One of these operational states, for example, is when the pneumatic spring is arranged in conventional operation, wherein, for example, the inner pressure in the air bellows differs from the atmospheric pressure. Such an operational state, for example, is when the vehicle is in conventional employment. During employment the air bellows, as a result of a compression or extension movement, may be moved into a first position, in which it is—possibly completely—compressed, and into a second position, in which it is—possibly completely—extended. Another operational state is a state in which the air bellows is deflated, for example when the vehicle, such as a trailer of a truck, on which the pneumatic spring is arranged, is parked over a longer period of time. In this case in the interior of the air bellows, there is atmospheric pressure, as is the case in the basic state, and the air bellows is in the first position. In this operational state of the air bellows the length of the pneumatic spring is usually smaller than the length of the pneumatic spring in the basic state of the air bellows. Furthermore, the air bellows may have a loading state, wherein the loading state is present when the vehicle is crane-loaded onto a train wagon for example, i.e. the axle assembly depends from the pneumatic spring. In this case the air bellows is in the second position. In the loading state of the air bellows the pneumatic spring, when measured along is central line, is usually longer than in the basic state of the air bellows. When a very high inner pressure is applied to the pneumatic spring in the operational state of the air bellows, it is also possible that the pneumatic spring has the same dimensions as in the loading state of the air bellows. The air bellows may then also be in its basic state when it is decoupled from the plunger, for example, i.e. when the air bellows is supported alone. When a trailer on which the pneumatic spring is arranged is loaded onto a train wagon, a ferry or the like, when the trailer is lifted over the chassis or the body, due to the axle weight, the air bellows is essentially completely stretched. This means that on the one hand when the inner pressure decreases due to the stretching of the air bellows, when the pressure is below a certain value—preferably below about 0.9 bar, particularly preferably below about 0.8 bar—the valve is opened so that air from the atmosphere or the surrounding area may flow into the interior space of the air bellows. Thus, it is reliably prevented that a negative bellows pressure or insufficient pressure develops and the air bellows folds in or tilts indefinably and is possibly damaged. On the other hand, the rolling or folding movement of the air bellows is not hindered since the interior space of the air bellows is only slightly increased due to the rolling or folding movement of the air bellows after the vehicle has been put down again. Therefore, at any time it is ensured that the unrolling or unfolding of the air bellows on the plunger functions reliably even if no pressure is applied to the air bellows by a source of compressed air. Thus, when the trailer is put down onto the train wagon or onto the ferry, the air bellows automatically returns to almost the same state as before the lifting operation. This state may be the basic state, for example when in particular the air bellows is deflated, or a state different from the basic state, for example when an interior pressure is applied to the air bellows. To put it differently, the air bellows may essentially be fully stretched during the lifting operation when the trailer is loaded onto a train wagon or a ferry. When the trailer is put down on the train wagon or the ferry, the air bellows unrolls or unfolds along the plunger since due to the air which flows in additionally via the valve, there is a sufficient inner pressure in the air bellows. This prevents tilting or folding in of the air bellows. Therefore, advantageously, according to the invention it is not necessary to limit the maximum spring range during the loading operation, for example by means of an arresting cable as preferred arresting or tensioning device. In particular, it is advantageously neither necessary to design the plunger such that it is divided. Rather, due to the ventilated air bellows according to the invention the problems of the prior art are solved in a simple manner. According to the invention the valve ensures a simple and safe ventilation of the air bellows. Moreover, each air bellows on the vehicle reacts independent of the pressure conditions of the other air bellows since each air bellows has its own ventilation through the valve.

According to a preferred further development of the invention the valve is a one-way valve and, thus, of simple construction. To put it differently, the valve is designed such that it allows the fluid or gas or air to flow in one direction only.

According to a variant of the invention the valve may be arranged in the axle-side region or in the body-side region of the air bellows, i.e. in the bellows itself and not in the plunger or another fixed component.

Alternatively or additionally, the valve may be mounted in an end portion which closes the body-side region of the air bellows. Thus, the valve is arranged not on the bellows itself but on another component fixed thereto.

It is advantageous to mount the valve in the plunger which is fixedly connected to the air bellows. This makes it possible to ensure at any time a clearly defined position of the valve. In this context, it is preferred that the valve is mounted in an end portion by means of which the plunger is closed at its body-side region.

It may be advantageous to design the air bellows at least essentially rotation symmetric to an axis of symmetry and to locate the valve on said axis of symmetry. "At least essentially rotation symmetric" means that there need not be a perfect rotation symmetry but that the essential structure of the air bellows is rotation symmetric while individual components such as fastening means or the opening for the connection to the compressed air line is or may be arranged decentralized and, thus, in such a manner that they disturb the rotation symmetry.

According to an advantageous embodiment the valve is designed as a one-way valve in which a nozzle is surrounded by an elastic tube which may close the opening of the nozzle when the respective pressure conditions are present. To put it differently, the valve comprises a nozzle formed by an elastic tube whose opening can be closed by the contraction of one end of the elastic tube. The free end of said tube extends into or ends in the interior space of the air bellows. "Contraction" means in particular that the inner surfaces of the tube are superimposed, i.e. that the tube essentially has the form of two superimposed webs.

According to a further advantageous embodiment of the invention the valve comprises a closing piece for at least one air opening. The closing piece is at least essentially plate-shaped, i.e. designed with a shape slightly deviating therefrom, and movable in the axial direction of the air bellows. The axial direction is that direction in which the air bellows mainly rolls in or folds in and unrolls or folds out. To put it differently, the at least one air opening of the valve is closed by the plate-shaped closing piece in the closed position of the valve while the at least one air opening is open after an axial displacement of the closing piece and provides an entrance to the interior space of the air bellows.

According to another advantageous embodiment of the invention the valve comprises an elastic membrane for closing at least one air opening.

It is advantageous if the valve has a cover which expediently extends beyond the contour of the air bellows and which, although on the one hand does not hinder the inflow of air, prevents or to a large extent makes impossible that foreign matter such as dust enters.

It may be advantageous to locate the valve entirely inside a chamber which is located in the dip bottom—in the body-side end portion or the body-side region, for example. Here, on the one hand, the valve is better protected from mechanical damage since it is also located in the housing. On the other hand, this encapsulation ensures a better protection from foreign matter such as dirt etc. Expediently, said chamber is no self-contained space but is open towards its surroundings in order to make possible an exchange of air between the surroundings and the interior space of the bellows via the valve. Here, the chamber may be limited by a surface of the plunger—preferably in the area of its end portion—which surface faces the interior space of the bellows. Expediently, the chamber towards the interior space of the bellows is limited by a buffer element which covers the valve. Alternatively, the chamber may be limited by a surface of the plunger—preferably in the area of its end portion—which faces away from the interior space of the bellows so that the chamber preferably essentially is formed by the plunger itself or the valve is located within the hollow plunger. Also a combination of these two variants is conceivable.

The object underlying the invention is also achieved by a pneumatic spring which comprises a plunger and an air bellows fixedly connected to the plunger, wherein the pneumatic spring is connected to a source of compressed air. The air bellows is designed as has been described above. Thus, the same advantages as for the ventilated air bellows apply to the pneumatic spring containing the air bellows.

The object underlying the invention is further achieved by a pneumatic spring system which comprises a plurality of the above-mentioned pneumatic springs as well as at least one source of compressed air, wherein at least a part of the pneumatic spring is connected to the same source of compressed air. Usually, there is only one source of compressed air which provides compressed air to all of the pneumatic springs. In certain cases it may also be advisable to provide several sources of compressed air, for example in order to separately supply compressed air to the left-hand and the right-hand sides of a vehicle or of a trailer, respectively, and in order to compensate for one-sided or lopsided loading, for example. The same advantages as they have been described in connection with the air bellows apply also to the pneumatic spring system.

These and other features, advantages, and objects of the present invention will be further understood and appreciated by those skilled in the art by reference to the following specification, claims, and appended drawings.

BRIEF DESCRIPTION OF THE DRAWINGS

FIG. 1 shows a first embodiment of the air bellows of the invention having a valve in its open position, FIG. 2 shows the first embodiment with the valve closed, FIG. 3 shows a second embodiment of the air bellows of the invention having a valve in its closed position, FIG. 4 shows the second embodiment with the valve in its open position, FIG. 7 shows a fourth embodiment of the air bellows of the invention having a valve in its closed position, FIG. 8 shows the fourth embodiment with the valve in its open position, FIG. 9 shows a fifth embodiment of the air bellows of the invention having a valve in its closed position, FIG. 10 shows the fifth embodiment with the valve in its open position, FIG. 11 shows a sixth embodiment of the air bellows of the invention having a valve in its closed position, and FIG. 12 shows the sixth embodiment with the valve in its open position.

DETAILED DESCRIPTION OF THE PREFERRED EMBODIMENTS

Figure 5:
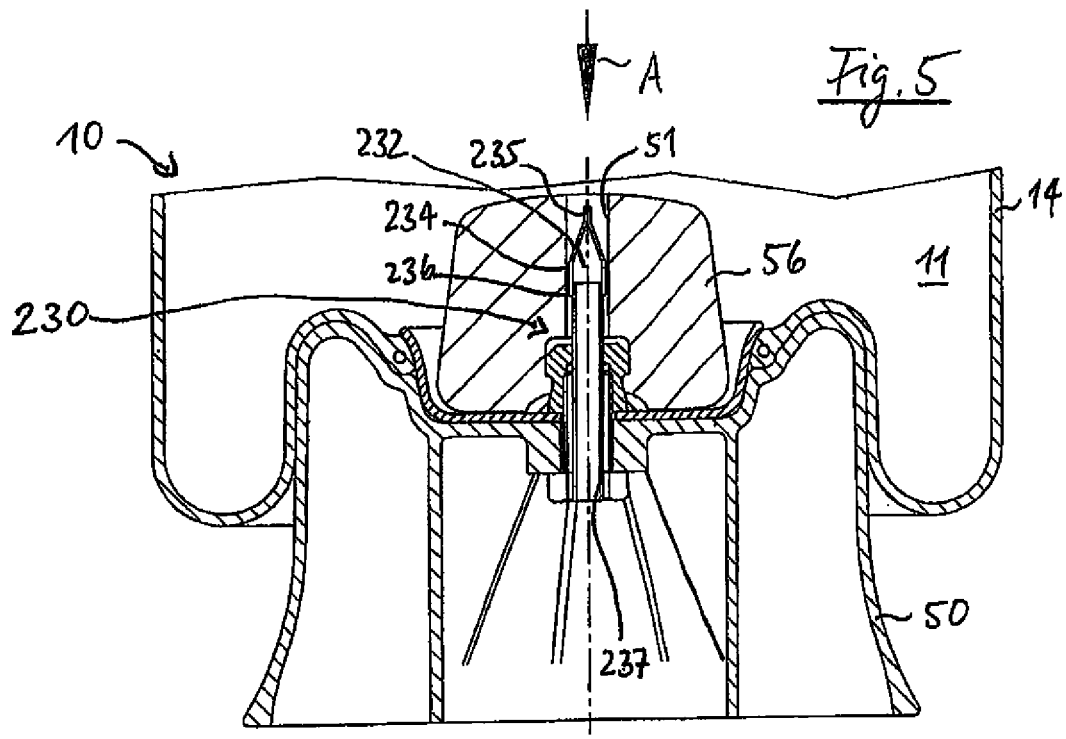
FIG. 5 shows a third embodiment of the air bellows of the invention having a valve in its closed position.

The pneumatic spring 10 shown in FIGS. 1 and 2 comprises an air bellows 14 with an upper, body-side region 16, whose upper end is closed by means of an end portion 30. Via a compressed air opening 12 provided in the upper portion 30 compressed air is supplied to the interior space 11 of the air bellows 14 via a compressed air line 13 and an only schematically shown source of compressed air P.

In order to ventilate the interior space there is provided a valve 20—in this first embodiment decentrally, i.e. not on the axis of symmetry—which valve is designed as a one-way valve 210. The valve 210 comprises a nozzle 212 which projects into the interior space 11 and is formed of an elastic tube 214 and which has an opening 211. The elastic tube 214 is supported on its first, body-side end 215 in a valve seat 213. At its second, axle-side end 216 the elastic tube 214 is designed such that it tightens or contracts due to its internal stress to such an extent that there is no axial air passage. This state is shown in FIG. 2. In case there is a pressure in the interior space 11 which is greater than the pressure in the exterior, the valve 210 is additionally brought or pressurized into its closed position.

At the top of the end portion 30 there is a dome-shaped hollow cover 218 which is provided with air openings 219 at its bottom, through which the air may flow into the interior of the cover 218. The elastic tube 214 is designed such that, as soon as the pressure in the interior space 11 falls bellow a certain degree and, thus, there is a positive pressure at the exterior, it widens at its second end 216 and provides or sets free an opening 211 through which the air from the surroundings or from the exterior may flow into the interior space 11. This situation occurs when for example a vehicle provided with such an air bellows is lifted by a crane and the air bellows unrolls or unfolds so that its volume enlarges and its interior pressure decreases accordingly. Such replenishment of air, which is indicated by arrows B in FIG. 1, from the exterior into the interior space 11 thus may reliably prevent that a negative pressure develops in the air bellows 14, which would hinder a correct rolling or folding and unrolling or unfolding of the air bellows 14. According to the invention such a compensation of pressure may be ensured by the valve 20 or 210 independent from the source of compressed air P and thus independent from the respective operational situation of a vehicle provided with the pneumatic spring. As soon as sufficient pressure has built up in the interior space 11, the elastic tube 214 contracts again at its elastic end 216, thus closing the opening 211. The pressure acting on the valve 210 is indicated by arrows A in FIG. 2. Due to the design of the valve 210 as a one-way valve, air may not be pressed out of the interior space 11.

It should be noted that the term "nozzle" does not necessarily mean an air passage section having a reduced cross-section—as it is shown in FIGS. 1 and 2—but a air passage section of the most general type.

The description of the first embodiment and the use of the reference signs applies analogously to the second to sixth embodiments of FIGS. 3 to 12, unless stated otherwise or not feasible technically. In order to avoid unnecessary repetition in the following mainly such details are described hereinafter in which the further embodiments differ from the first embodiment.

FIGS. 3 and 4 show a second embodiment of the air bellows 14 according to the invention, wherein a valve 220 is arranged in the body-side end portion 54 of the plunger 50, which valve is similar to that of the first embodiment. The axle-side region 18 of the air bellows 14 is connected fixedly and airtight to compressed air to the region 56, which may be designed as an elastomer buffer element, and the end portion 54 of the plunger. Similar as in the first embodiment, an elastic tube 224 is arranged in a valve seat 223 such that the elastic tube 224 may provide a connection to the interior space 11 of the air bellows 14. Here, the first, body-side end 225 faces towards the interior space 11, and the second, axle-side end 226 of the elastic tube 224 faces towards the exterior. In the second embodiment, the first end may contract or tighten to such a degree that no air may pass through the elastic tube 224 into the interior space 11. According to the second embodiment the first end 225 projects into a chamber 52 which is provided in the end portion 54. The chamber 52 is in communication with the interior space 11 of the air bellows 14 via an air channel 51. A cover 228 projects from the valve seat 223 into the interior space of the plunger 50, wherein the cover 228 at its bottom end is designed to be parallel to the end portion 54 and comprises air openings 229 through which air may pass in the open position of the valve 220. This state is shown in FIG. 4, wherein the air flow is indicated by arrows B. The air flows through an opening 221 which is formed by a corresponding positive pressure in the interior space of the plunger 50 in the elastic tube 224. As soon as there has been a pressure compensation, or the positive pressure in the interior space of the plunger 50 is no longer sufficient, the elastic tube 224 contracts again and forms an airtight barrier of the plunger towards the interior space 11 of the air bellows 14. The pressure acting in this static situation is indicated by arrows A in FIG. 3.

Figure 6:
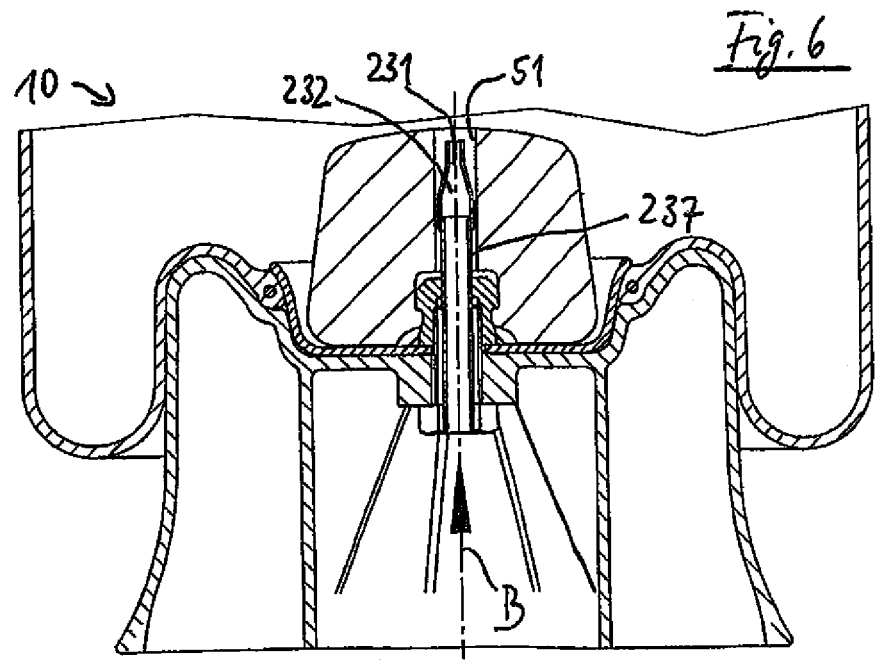
FIG. 6 shows the third embodiment with the valve in its open position.

FIGS. 5 and 6 show a third embodiment of the air bellows 14 according to the invention, wherein FIG. 5 shows the closed position of the valve 230 contained therein, while FIG. 6 shows the opened position of the valve 230. Different from the second embodiment, the valve 230 is slid onto a tubule 237 by means of an elastic tube 234 since it provides a connection between the interior space of the plunger 15 and the interior space 11 of the air bellows and, to this end, intersperses the end portion 54 of the plunger 50. The functioning of the valve 230 with its first, body-side end 235 and its second, axle-side end 236 as well as the respective pressure and flow situations with the respective arrows A and B is the same as in the second embodiment. The elastic tube 234 as well as the section of the tubule 237 onto which it is slid or put are located in an air channel 51 which is provided in the body-side region 56 of the plunger—which is preferably designed as an elastomer buffer element.

The elastic tube 214, 224 and 234, respectively, preferably is made of an elastic rubber or another elastic material having suitable properties.

FIGS. 7 and 8 show a fourth embodiment of the air bellows 14 according to the invention, which is provided with a valve 240. The valve 240, as is the case in the second and third embodiments, is arranged on the axis of symmetry of the air bellows 14 and, here, is designed as an essentially plate-shaped, axially slidable closing piece 242. The closing piece 242 is arranged in a chamber 52 which is defined or limited by the body-side region 56—which is preferably designed as an elastomer buffer element—and the end portion 54 of the plunger 50, and has a central guiding portion 245 which extends in the axial direction and ends in a thickened end portion 242. The central guiding portion 245 is guided in a guiding bore 247 which axially intersperses the end portion 54 of the plunger 50, and the thickened end portion 246 is located outside of the chamber 52. Consequently, the closing piece 242 is supported in the chamber 52 in a movable manner and in such a way that it will not get lost. In case there is a positive pressure in the interior space 11 of the air bellows 14 relative to the interior space of the plunger 50, the closing piece 242 is pushed onto the end portion 54 and closes air openings 249 which intersperse the end portion 54 from the interior space of the plunger 50 to the chamber 52. As as soon as there is sufficient positive pressure in the interior space of the plunger 50, the closing piece 242 will be axially displaced away from the end portion 54 towards the body-side end of the chamber 52 and the air may flow through the air openings 249 into the chamber 52, and from there via an air channel 51 into the interior space 11 of the air bellows 14, as is indicated by arrows B.

The closing piece 242 preferably is made from an elastic rubber or another elastic material having suitable properties.

FIGS. 9 and 10 show a fifth embodiment of the present invention, which is similar to the fourth embodiment. A valve 250 is designed similar to the fourth embodiment with a closing piece 252, a central guiding portion 245, a thickened end portion 246 as well as a guiding bore 247. The main difference to the fourth embodiment is that the valve 250 is arranged entirely in the chamber 52, which is defined or limited by the body-side region 56—which preferably is designed as elastomer buffer element—and the end portion 54 of the plunger 50. In a valve seat 253 there is provided a recess 58 in the body-side region 56 of the plunger 50, in which the closing piece 252 may move. Air openings 261 intersperse the valve seat 253 and, thus, form a connection between the recess 58 and the chamber 52, wherein the chamber 52 communicates with the interior space of the plunger 50 via an air opening 259 which intersperses the end portion 54. The recess 58, in turn, communicates with the interior space 11 of the air bellows 14 via an air channel 51. The movement of the valve 250 from the opened and closed positions and vice versa is very similar to the fourth embodiment.

The closing piece 252 preferably is made from an elastic rubber or another elastic material having suitable properties.

FIGS. 11 and 12 show a sixth embodiment of the invention. Similar to the fifth embodiment, there is formed a valve 260 in a recess 58 of a valve seat 263, wherein the valve seat 263 is formed in a chamber 52 which is defined or limited by a body-side region 56—which is preferably designed as an elastomer buffer element—and the end portion 54 of the plunger 50. A membrane 262 is held in a membrane holder 265 which forms part of the valve seat 263. The recess 58 above the membrane 262 communicates with the interior space 11 of the air bellows 14 via an air channel 51. Below the membrane 262, there are provided air openings 261 which axially intersperse the valve seat 263 and provide a connection between the space 267 below the membrane 262 and the chamber 52. The chamber 52, in turn, is connected to the interior space of the plunger 50 via air openings, which are not explicitly shown in the drawings. In the case of a corresponding negative pressure in the interior space 11 of the air bellows the membrane 262, as is shown in FIG. 12, is essentially clamped in the membrane holder 265 in a non-deflected manner. Via air channels 269, which intersperse the membrane holder 265 and provide a connection between the space 267 and the recess 58, when the membrane 262 is not deflected, air may pass from the interior space of the plunger 50 via the air openings 261 and the space 267 into the recess 58, and via the air channel 51 further into the interior space 11 of the air bellows 14. In case the pressure in the interior space 11 of the air bellows 14 increases by a certain degree, the membrane 262 is deflected towards the bottom to such an extent that it closes the air openings 261. This closed position is shown in FIG. 11. The fact that the membrane 262 is arranged in the recess 58 or in the chamber 52, respectively, ensures that the valve 262 is highly protected from disturbing influences such as dirt or mechanical influences.

The membrane 262 preferably is made from an elastic rubber material or another suitable material having sufficient elasticity.

The air bellows of the invention usually is provided with a relatively soft spring stiffness and, thus, usually is of little importance for springing or suspension purposes. Thus, the air bellows only serves to adjust the height of the vehicle above the axle, while damping is done via suitable suspension arms.

As a matter of course, individual features of certain embodiments such as the site and the exact design of individual components of the valve may also be realized in other embodiments, insofar as this is not explicitly excluded in the description or prohibits itself for technical reasons.

The invention claimed is as follows:

1. An air bellows for a pneumatic spring of a commercial vehicle, comprising:
   an axle-side region and a body-side region, wherein the axle-side region arranged on a plunger and movable by a compression or extension movement between a first, compressed position and a second, extended position; and
   an interior space adapted to be filled with compressed air via a compressed air opening connected to a compressed air line; and
   a valve connected to an atmosphere for ventilating the interior space and movable to a closed position by applying compressed air present in the interior space to the valve, wherein the valve is located entirely within a chamber provided in or on the plunger; and
   wherein the air bellows is substantially rotation symmetric to an axis of symmetry, and the valve is located on the axis of symmetry, and wherein the air bellows is configured to support a commercial vehicle.

2. The air bellows of claim 1, wherein the valve is a one-way valve.

3. The air bellows of claim 2, wherein the air bellows is closed at the body-side region by an end portion.

4. The air bellows of claim 2, wherein the air bellows is fixedly connected to the plunger, and the valve is arranged in the plunger which closes a body-side portion of the plunger.

5. The air bellows of claim 3, wherein the valve comprises a nozzle formed by an elastic tube, and an opening that connects the valve to the atmosphere and which is closable by contracting one end of the elastic tube.

6. The air bellows of claim 3, wherein the valve further comprises a substantially plate-shaped closing piece for at least one air opening, which is movable in the axial direction of the air bellows.

7. The air bellows of claim 3, wherein the valve further comprises an elastic membrane for closing the at least one air opening.

8. The air bellows of claim 5, wherein the valve further comprises a cover which does not hinder an inflow of air.

9. The air bellows of claim 1, wherein the air bellows is closed at the body-side region by an end portion.

10. The air bellows of claim 1, wherein the air bellows is fixedly connected to the plunger, and the valve is arranged in the plunger which closes a body-side portion of the plunger.

11. The air bellows of claim 10, wherein the valve is arranged in an end portion of the plunger.

12. The air bellows of claim 1, wherein the valve comprises a nozzle formed by an elastic tube, and an opening that connects the valve to the atmosphere and which is closable by contracting one end of the elastic tube.

13. The air bellows of claim 12, wherein the valve further comprises a cover which does not hinder an inflow of air.

14. The air bellows of claim 1, wherein the valve further comprises a substantially plate-shaped closing piece for at least one air opening, which is movable in the axial direction of the air bellows.

15. The air bellows of claim 1, wherein the valve further comprises an elastic membrane for closing the at least one air opening.

16. A pneumatic spring comprising the air bellows according to claim 1, wherein the pneumatic spring is connected to a source of compressed air.

17. A pneumatic spring system, comprising a plurality of pneumatic springs according to claim 16, wherein at least two of the plurality of pneumatic springs are connected to the source of compressed air.

* * * * *